United States Patent [19]
Watanabe et al.

[11] Patent Number: 5,372,320
[45] Date of Patent: Dec. 13, 1994

[54] TAPE CASSETTE

[75] Inventors: Masaru Watanabe, Nishinomiya; Tousaku Nishiyama, Katano; Tsumoru Ohata, Kyoto, all of Japan

[73] Assignee: Matsushita Electic Industrial Co., Ltd., Osaka, Japan

[21] Appl. No.: 12,421

[22] Filed: Feb. 2, 1993

[30] Foreign Application Priority Data

Feb. 3, 1992 [JP] Japan ................................. 4-17367
Feb. 3, 1992 [JP] Japan ................................. 4-17368

[51] Int. Cl.⁵ ............................................ G11B 23/02
[52] U.S. Cl. ............................................ 242/347.1
[58] Field of Search ............... 242/192, 197, 198, 199; 360/132

[56] References Cited

U.S. PATENT DOCUMENTS

| 4,614,270 | 9/1986 | Oishi ........................... 360/132 X |
| 4,775,911 | 10/1988 | Sato et al. ..................... 360/132 |
| 5,022,520 | 6/1991 | Yeol ............................. 242/199 X |
| 5,214,554 | 5/1993 | Vollmann et al. .............. 242/199 X |

FOREIGN PATENT DOCUMENTS

| 0526937 | 2/1993 | European Pat. Off. ........... 360/132 |
| 3-44857 | 2/1991 | Japan . |
| 3-183078 | 8/1991 | Japan .............................. 360/132 |
| 4-132063 | 5/1992 | Japan . |

Primary Examiner—Daniel P. Stodola
Assistant Examiner—John P. Darling
Attorney, Agent, or Firm—Wenderoth, Lind & Ponack

[57] ABSTRACT

A tape cassette has a shutter which can be opened and closed for accommodating a magnetic tape which records information such as music and reproduces recorded information. The shutter is made of thermoplastic resin and hardly generates abraded powders as a result of the sliding of the shutter in contact with the casing. The shutter has engaging portions in specific configurations so as to prevent the shutter from being dislocated from the casing.

9 Claims, 11 Drawing Sheets

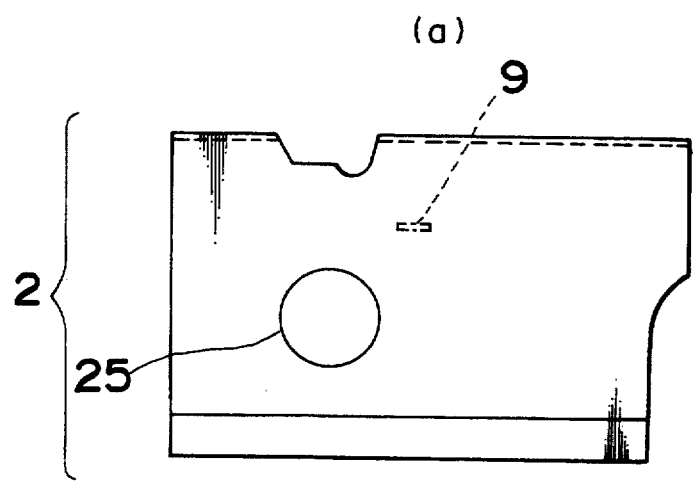
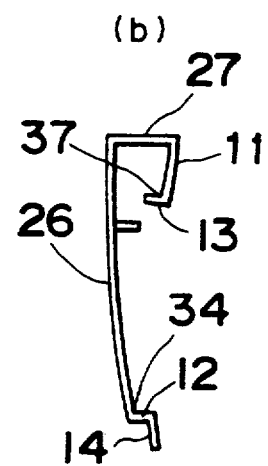
Fig. 4 (a)
FIG. 4 (b)

5,372,320

TAPE CASSETTE

BACKGROUND OF THE INVENTION

1. Field of the Invention

The present invention relates to a tape cassette for accommodating a tape which records information such as music and reproduces recorded information.

2. Description of the Related Arts

According to a tape cassette accommodating a tape-shaped recording medium (hereinafter referred to as tape) disclosed in Japanese Patent Laid-Open Publication No. 3-44857, a magnetic head inserting window and a pinch roller inserting window are covered with a shutter which can be opened and closed. The shutter is provided to prevent the penetration of dust from the inserting window into the inside of the tape cassette, i.e. to prevent dust from attaching to the recording/reproducing surface of the tape. Thus, signals can be prevented from being erroneously recorded or reproduced. In addition, the shutter prevents a hand from touching the recording/reproducing surface of the tape so as to prevent it from being damaged. According to the shutter of the tape cassette disclosed in Japanese Patent Laid-Open Publication No. 3-44857, a guide is formed on a surface of the shutter, and a guide groove is formed on the casing of the tape cassette main body. This construction has, however, a problem in that the guide of the shutter can come off of the guide groove of the casing by a slight force being applied thereto, and as a result the shutter is dislocated from the casing. Normally, the shutter is made of a metal such as stainless steel. Needless to say, a shutter made of metal is expensive. As a means for solving this problem, it seems preferable that the shutter be made of resin. But a shutter made of resin is very elastic, and thus the conventional shutter construction allows the shutter to be easily dislocated from the casing.

SUMMARY OF THE INVENTION

It is an object of the present invention to provide a tape cassette in which a shutter is not easily dislocated from a casing.

It is another object of the present invention to provide a tape cassette in which a shutter can be easily installed on a casing.

It is still another object of the present invention to provide a tape cassette which is inexpensive.

In accomplishing these and other objects of the present invention, there is provided a tape cassette comprising a casing having a front surface accommodating a tape-shaped recording medium and having a plurality of windows formed thereon. A lower surface has a pair of reel base inserting openings formed thereon, and an upper surface is parallel with the lower surface. A shutter is sectionally U-shaped and slidable to open and close the windows of the casing in the direction in which the respective centers of the pair of the reel base inserting openings are connected with each other. The shutter comprises a lower plate which contacts the lower surface of the casing and slides in contact therewith, an upper plate which contacts the upper surface of the casing and slides in contact therewith, and a front plate connecting the upper plate and the lower plate with each other, contacting the front surface of the casing and sliding in contact therewith. In this construction, first engaging portions are formed at the lower end of the upper plate and the lower plate, respectively such that one first engaging portion is perpendicular to the upper plate and the other first engaging portion is perpendicular to the lower plate, and each first engaging portion is parallel with the front plate. Guide grooves are formed on the upper and lower surfaces of the casing, respectively, such that one guide groove has an engaging surface perpendicular to the upper surface of the casing and the other guide groove has an engaging surface perpendicular to the lower surface thereof, whereby each of the first engaging portions formed on the upper plate and the lower plate of the casing engages the engaging surface of the guide grooves formed in the upper and lower surfaces of the casing, respectively, and slides along the engaging surface of the guide groove.

According to the above construction, each of the first engaging portions formed on the upper plate and the lower plate of the casing engages the engaging surface of each guide groove formed in the upper and lower surfaces of the casing, respectively, and slides along the engaging surface of each guide groove. Therefore, regardless of whether the shutter is made of metal or resin, which is elastic, the shutter is not dislocated from the casing.

A second engaging portion is formed at the leading end of the first engaging portion of the lower plate in such a manner that the second engaging portion is parallel with the lower plate and perpendicular to the first engaging portion. The second engaging portion is sandwiched between the guide groove formed on the lower surface of the casing and the shutter-pressing plate formed on the lower surface of the casing. According to this construction, it is possible to reliably prevent the shutter from being dislocated from the casing. The distance between the engaging surface of the guide groove and the end of the upper portion of the shutter-pressing plate is more than twice as large as the thickness of the shutter and smaller than ten times as large as that of the shutter. This construction prevents the shutter from being dislocated from the casing.

In addition to the above-described construction, the shutter is made of thermoplastic resin. In this manner, the shutter can be reliably prevented from being dislocated from the casing. Further, a shutter made of thermoplastic resin can be manufactured at a lower cost than a shutter made of metal. Furthermore, abraded powders are not generated by the sliding contact between the shutter made of thermoplastic resin and the casing. As a result, signals can be prevented from being erroneously recorded or reproduced.

As described above, the second engaging portion is sandwiched between the guide groove formed on the lower surface of the casing and the shutter-pressing plate formed on the lower surface of the casing. The distance between the engaging surface of the guide groove and the end of the upper portion of the shutter-pressing plate is more than twice as large as the thickness of the shutter and smaller than ten times as large as that of the shutter. In order to insert the second engaging portion of the shutter into the small space between the shutter-pressing plate and the guide groove, the shutter is made of resin, which is very elastic, and a cut-away portion is formed on the casing in such a manner that the dimension of the cut-away portion is larger than that of an image of the shutter-pressing plate formed by projecting the shutter-pressing plate on the casing in the lengthwise and widthwise directions thereof. In installing the shutter on the casing, the second engaging portion is pressed toward the rear of the casing when the second engaging portion of the shutter is at the cut-away portion. As a result, the second engaging portion is deformed in conformity with the configuration of the cut-away portion and hence can be easily inserted into the space between the shutter-pressing plate and the guide groove.

A through-opening having the same dimension as that of the shutter-pressing plate is formed on the lower surface of the casing in such a manner that the position of the through-opening coincides with the position on which the shutter-pressing plate is projected. Consequently, the shutter-pressing plate is not undercut in forming the casing. Accordingly, a die for shaping the casing has a very simple construction and thus the tape cassette can be manufactured at a low cost.

Supposing that the shutter is made of a thermoplastic resin, a bent portion perpendicular to the lower plate is formed on the lower plate of the shutter. A pair of projections each engaging a gear formed on each of a pair of hubs disposed inside the casing are formed on the bent portion. At least one rib is provided on the side of the bent portion on which the projection is not formed. Alternatively, the bent portion is made to be gradually thicker toward the lower plate. In addition, each projection is made to be gradually thicker toward the bent portion. Owing to the above construction, the bent portion and the projection can withstand an external force applied thereto even though the shutter is made of resin, which is smaller than metal in rigidity.

According to the tape cassette of the present invention, the shutter is not easily dislocated from the casing. Therefore, the shutter can be made of resin, and thus the tape cassette can be manufactured at a low cost. The shutter made of resin hardly generates abraded powders as a result of the slide of the shutter in contact with the casing of the tape cassette. Thus, the quality of the tape cassette can be greatly improved. As described above, the shutter can be reliably used because it can be retained on the casing. Further, the shutter can be easily installed on the casing and a die for shaping the casing has a simple construction. Accordingly, the tape cassette can be manufactured with efficiency, and therefore at a low cost. Furthermore, the projection and the bent portion formed on the shutter are not easily damaged or broken, and hence the tape cassette is durable.

BRIEF DESCRIPTION OF THE DRAWINGS

The above and other objects and features of the present invention will become clear from the following description taken in conjunction with preferred embodiments of the invention and with reference to the accompanying drawings, in which:

FIG. 4(a) is a plan view and FIG. 4(b) a side elevation showing a shutter of the tape cassette of FIG. 1;

DETAILED DESCRIPTION OF THE INVENTION

Figure 1:
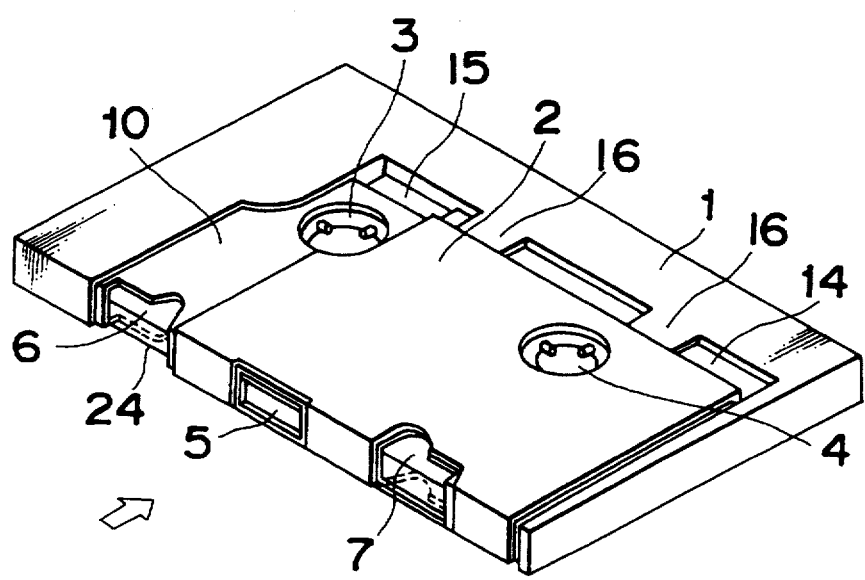
FIG. 1 is a perspective view showing a tape cassette according to a first embodiment of the present invention.

Before the description of the present invention proceeds, it is to be noted that like parts are designated by like reference numerals throughout the accompanying drawings.

A first embodiment of the present invention will be described below with reference to FIGS. 1 through 4.

As shown in FIG. 1, a shutter 2 to be installed on a casing 1 accommodating a tape 24 is sectionally U-shaped and can be opened and closed in the direction in which the respective centers of a pair of reel base inserting openings 3 and 4 are connected with each other. The casing 1 has a magnetic head-inserting window 5 and pinch roller inserting windows 6 and 7 on the front surface thereof. Referring to FIG. 2, one end of spring 8 is locked by the casing 1 and the other end thereof engages an engaging projection 9 formed on the shutter 2 so as to close the windows 5, 6, and 7 formed on the front surface of the casing 1. The casing 1 has a lower surface 10 within the sliding range of the shutter 2. The lower surface 10 is a little higher than the shutter 2 so as to prevent the shutter 2 from sliding out of the casing 1.

Referring to FIG. 4, the shutter 2 is sectionally U-shaped and comprises an upper plate 11, a lower plate 26, and a front plate 27. First engaging portions 12 and 13 extend from the lower end of the lower plate 26 and the upper plate 11, respectively. When the shutter 2 is installed on the casing 1, the first engaging portions 12 and 13 are perpendicular to the lower plate 26 and the upper plate 11 and parallel with the front plate 27. A second engaging portion 14 extends from the leading end of the first engaging portion 12 of the lower plate 26 in such a manner that the second engaging portion 14 is parallel with the lower plate 26 and perpendicular to the first engaging portion 12. The upper plate 11 and the lower plate 26 become gradually closer to each other toward the lower end thereof when the shutter 2 is not on the casing 1. Thus, when the shutter 2 is installed on the shutter 1, the upper plate 11 and the lower plate 26 are brought into close contact with the casing 1, thus preventing dust from penetrating into the casing 1.

Preferably, the shutter 2 is made of thermoplastic resin which is elastic and slidable. For example, polyacetal resin or polyamide resin are preferably used as the material of the shutter 2. The thickness of the shutter 2 is greater than 0.3 mm and smaller than 0.4 mm so that the shutter 2 is elastic. If the thickness of the shutter 2 is smaller than 0.3 mm, the rigidity of the shutter 2 becomes low and is hence easily broken or deformed. On the other hand, if the thickness of the shutter 2 is greater than 0.4 mm, the rigidity of the shutter 2 becomes too high and is thus bent or broken because the elasticity of the shutter 2 deteriorates when the shutter 2 is installed on the casing 1.

Figure 2A:
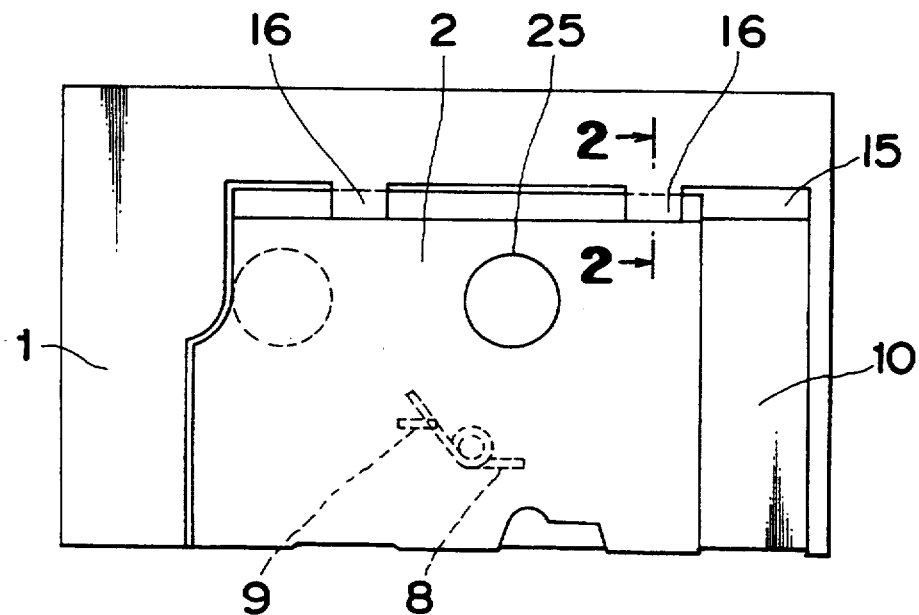
FIG. 2(a) is a plan view showing the bottom surface of the tape cassette of FIG. 1 and FIGS. 2(b)-2(e) are partial alternative sectional views thereof taken along line 2—2.
Figure 2B:
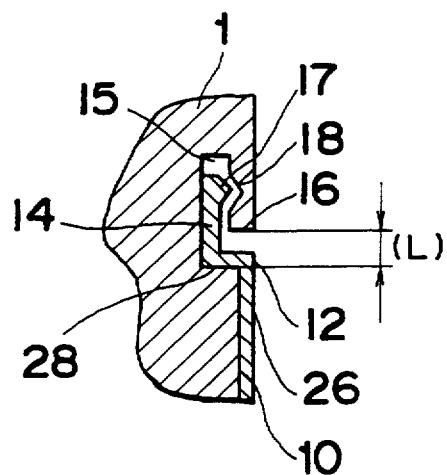
Figure 2C:
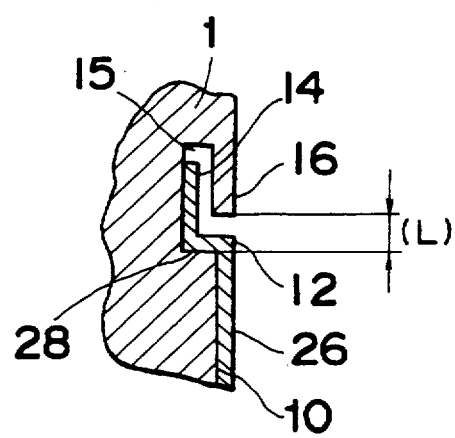

As shown in FIG. 2(c), a guide groove 15 formed in the lower side of the casing 1 has an engaging surface 28 perpendicular to the lower surface 10 of the casing 1 so that the engaging surface 28 engages the first engaging portion 12 of the shutter 2. Thus, the shutter 2 cannot be easily dislocated from the casing 1. As described above, the upper plate 11 and the lower plate 26 become gradually closer to each other toward the lower end thereof when the shutter 2 is not on the casing 1. Therefore, the engaging surface 28 is tightly engaged by the first engaging portion 12. This is because the shutter 2 is made of resin, which is very elastic. Supposing that the shutter 2 is made of metal and that the upper plate 11 and the lower plate 26 gradually become closer to each other toward the lower end thereof when the shutter 2 is not on the casing 1, the casing 1 is then sandwiched between the upper and lower surfaces of the shutter 2 when the shutter 2 is on the casing 1 because the rigidity of metal is much higher than that of resin, and thus the shutter 2 is incapable of sliding along the casing 1.

The inventors have discovered that the above-described construction is essential for preventing the shutter 2 from being dislocated from the casing 1. That is, the first engaging portion 12 engages the engaging surface 28 because the engaging surface 28 of the groove 15 is perpendicular to the lower surface 10 of the casing 1, and the first engaging portion 12 is perpendicular to the lower plate 26 of the shutter 2. That is, if the casing 1 is not provided with either the engaging surface 28 or the first engaging portion 12, the effect of the present invention cannot be obtained. In addition, a shutter-pressing plate 16 is formed on the casing 1 so that the shutter-pressing plate 16 presses the second engaging portion 14 of the shutter 2. Thus, there is no possibility of a person removing the shutter 2 from the casing 1. Referring to FIGS. 2(b) and 2(c), it is necessary that the distance (L) between the engaging surface 28 of the guide groove 15 and the lower end of the upper portion of the shutter-pressing plate 16 is more than twice as large as the thickness of the shutter 2 and less than ten times as large as that of the shutter 2. If the value of (L) is smaller than twice as large as the thickness of the shutter 2, it is difficult to insert the first engaging portion 12 of the shutter 2 and the second engaging portion 14 thereof into the guide groove 15, and thus an assembling operation cannot be accomplished efficiently. If the value of (L) is greater than ten times as large as that of the shutter 2, there is a possibility that a person can remove the shutter 2 from the casing 1.

As shown in FIG. 2(b), a projection 17 is formed on the second engaging portion 14 of the shutter 2, and a small groove 18, which engages the projection 17, is formed on the shutter-pressing plate 16. In this manner the shutter 2 can be reliably prevented from being dislocated from the casing 1.

Figure 3A:
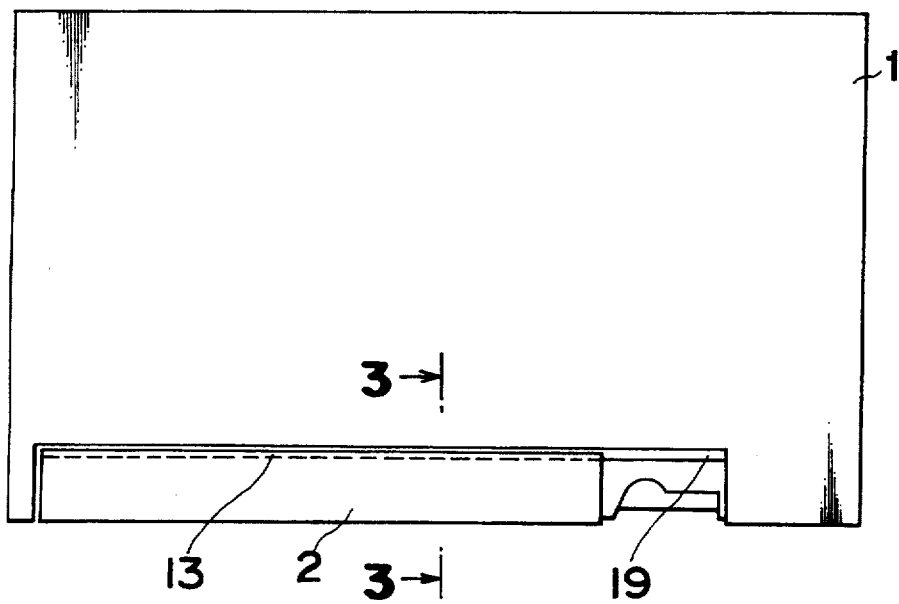
FIG. 3(a) is a plan view showing the upper surface of the tape cassette of FIG. 1 and FIGS. 3(b)-3(d) are partial alternate sectional views thereof taken along line 3—3.
Figure 3B:
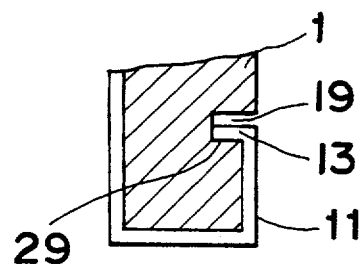

As shown in FIG. 3(b), a guide groove 19 formed on the upper surface of the casing 1 has an engaging surface 29 perpendicular to the upper surface of the casing 1. The first engaging portion 13 perpendicular to the upper plate 11 of the shutter 2 engages the engaging surface 29 and slides along the engaging surface 29 when the shutter 2 is on the casing 1. Thus, it is very difficult to remove the shutter 2 from the casing 1. The upper plate 11 and the lower plate 26 become closer to each other toward the lower end thereof when the shutter 2 is not on the casing 1, as described previously. Thus, the first engaging portion 13 engages the engaging surface 29 of the guide groove 19 in close contact therewith. The inventors have discovered that the above-described construction is essential for preventing the shutter 2 from being dislocated from the casing 1. That is, the engaging surface 29 of the guide groove 19 is perpendicular to the upper surface of the casing 1 and the engaging portion 13, perpendicular to the upper plate 11 of the shutter 2, engages the engaging surface 29 when the shutter 2 is on the casing 1. Accordingly, if the tape cassette is not provided with the engaging surface 29 or the engaging portion 13, the effect of the present invention cannot be obtained. The expression "perpendicular" of "the engaging surface is perpendicular to the upper or lower surface of the casing" described in the first embodiment means an angle in the range of 90°±10°. If the engaging surface forms an angle smaller than 80° or greater than 100° with the upper or lower surface of the casing 1, the shutter 2 is removed from the casing 1.

A second embodiment of the present invention is described below with reference to FIGS. 5 through 7.

Figure 5A:
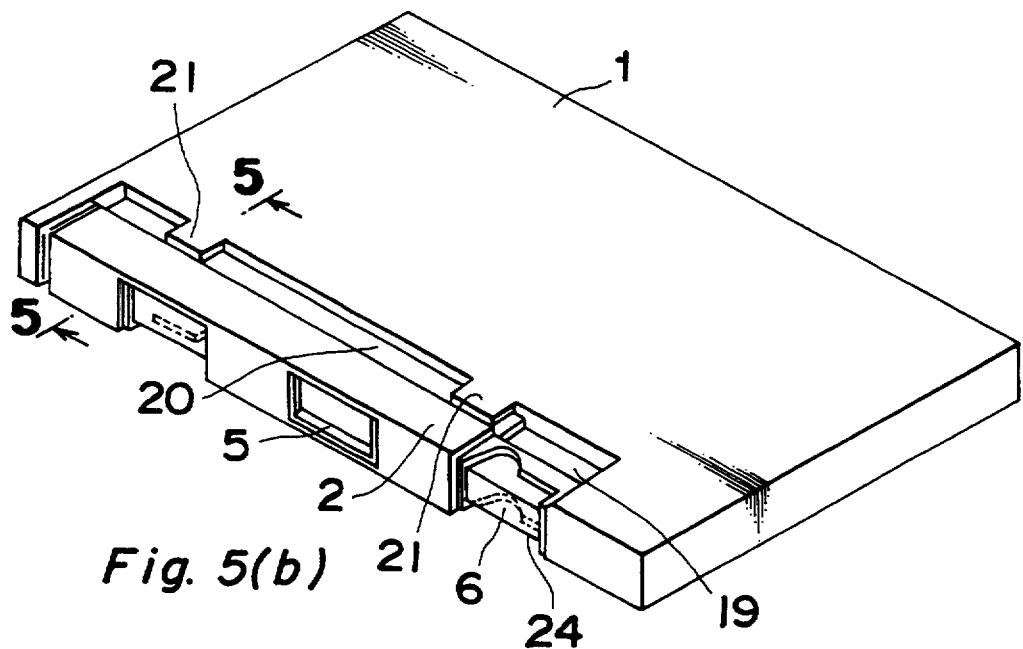
FIG. 5(a) is a perspective view showing the upper surface of a tape cassette according to a second embodiment of the present invention and FIG. 5(b) is a partial sectional view thereof taken along line 5—5.
Figure 5B:
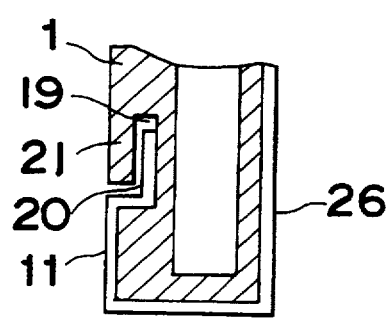
Figure 6:
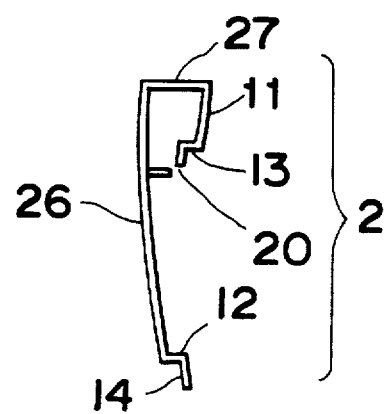
FIG. 6 is a side elevation showing a shutter of the tape cassette of FIG. 5.
Figure 7:
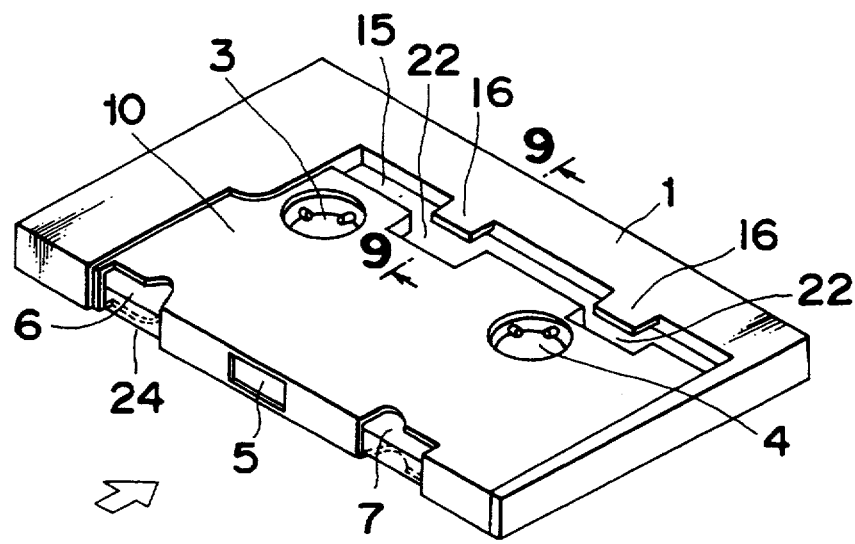
FIG. 7 is a perspective view showing a state in which the shutter of the tape cassette of FIG. 5 is not on a casing.

As shown in FIG. 6, the shutter 2 according to the second embodiment is approximately U-shaped and has engaging portions 12 and 13 at both ends of the shutter. The engaging portions 12 and 13 are perpendicular to the lower plate 26 and the upper plate 11, respectively. In addition, engaging portions 14 and 20 extend from the end of the engaging portion 12 and the engaging portion 13, respectively, in such a manner that the engaging portion 14 is parallel with the lower plate 26 and perpendicular to the engaging portion 12 and the engaging portion 20 is parallel with the upper plate 11 and perpendicular to the engaging portion 13. As shown in FIGS. 5(a) and 5(b), a shutter-pressing plate 21 is formed on the casing 1 so as to sandwich the engaging portion 20 formed on the upper plate 11 of the shutter 2. Further, the shutter-pressing plate 16 is formed on the casing 1 so as to press the second engaging portion 14 formed on the lower plate 26 of the shutter 2. Therefore, the construction according to the second embodiment is more reliable than that of the first embodiment in preventing the shutter 2 from being dislocated from the casing 1 and thus it is difficult for a person to remove the shutter 2 from the casing 1.

In order to prevent a person from removing the shutter 2 from the casing 1, it is necessary that the distance (L) between the engaging surface 28 of the guide groove 15 and the lower end of the upper portion of the shutter-pressing plate 16 is more than twice as large as the thickness of the shutter 2 and less than ten times as large as that of the shutter 2, as described previously. In order to insert the second engaging portion 14 of the shutter 2 into the space between the shutter-pressing plate 16 and the guide groove 15 in installing the shutter 2 on the casing 1, the following construction is provided in consideration of a small dimension of (L). That is, a cut-away portion 22 is formed on the casing 1 as shown in FIG. 7. The dimension of the cut-away portion 22 is larger than that of an image of the shutter-pressing plate 16 formed by projecting the shutter-pressing plate 16 in the lengthwise and widthwise directions thereof. In installing the shutter 2 on the casing 1 from the head-inserting side as shown by an arrow in FIG. 7, the second engaging portion 14 is pressed toward the rear of the casing 1 when the second engaging portion 14 of the shutter 2 is at the cut-away portion 22. As a result, the second engaging portion 14 is deformed in conformity with the configuration of the cut-away portion 22 and hence can be easily inserted into the space between the shutter-pressing plate 16 and the guide groove 15. Since the shutter 2 is made of resin, it returns to its original state immediately after it is installed on the casing 1. As described previously, the shutter 2 is made of resin, which is very elastic, and the thickness thereof is greater than 0.3 mm and smaller than 0.4 mm. Therefore, the second engaging portion 14 can be easily inserted into the space between the shutter-pressing plate 16 and the guide groove 15. If the shutter 2 is made of metal, the shutter 2 is plastically deformed as a result of the pressing of the leading end of the shutter 2 toward the rear of the casing 1 when the second engaging portion 14 is at the cut-away portion 22. Consequently, the shutter 2 is of no use.

Figure 8:
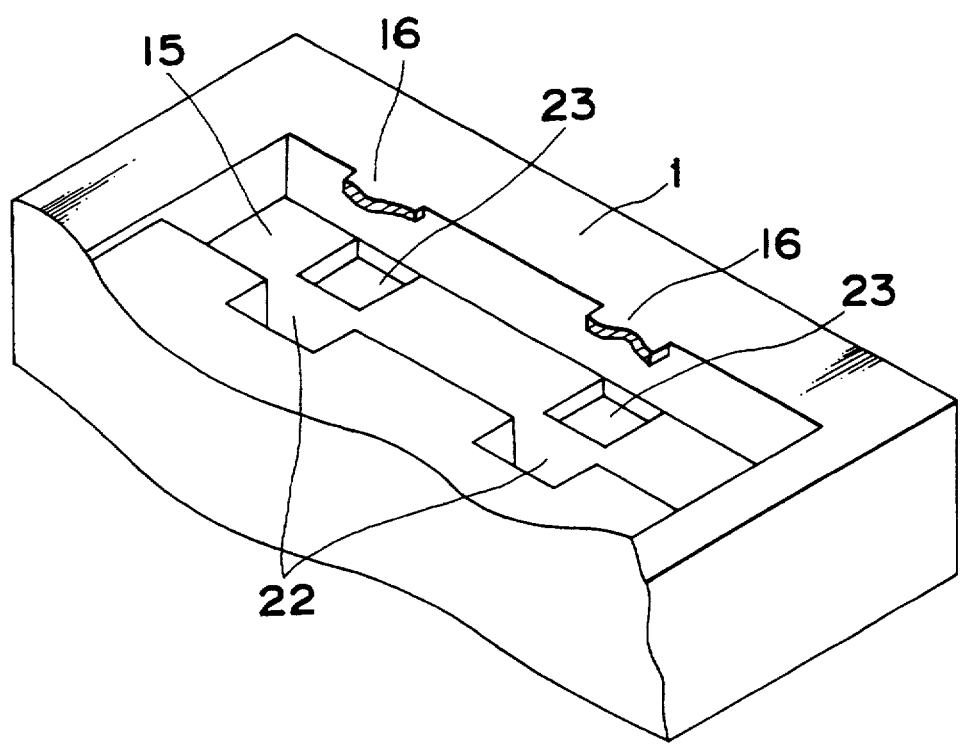
FIG. 8 is a perspective view showing a cut-away portion and a through-hole of a tape cassette.
Figure 9:
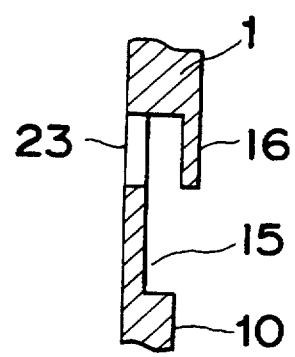
FIG. 9 is a sectional view showing the tape cassette taken along a line 9—9 of FIG. 7.
Figure 10:
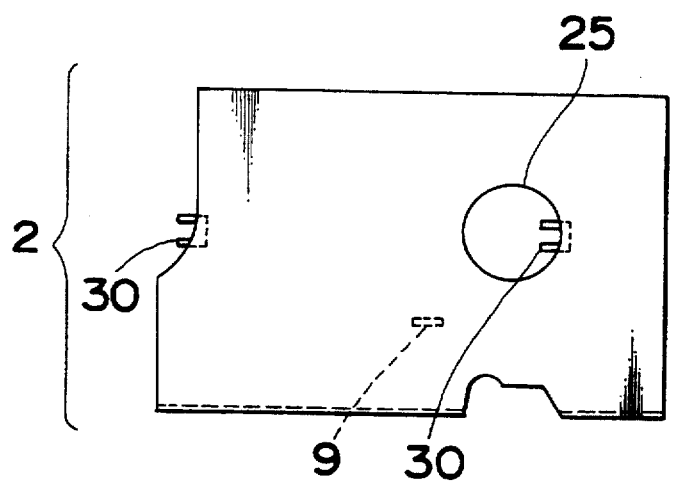
FIG. 10(a) is a plan view.
FIG. 10(c) is a bottom view and FIG. 10(b) is a side elevation showing a shutter of a tape cassette.
Figure 10:
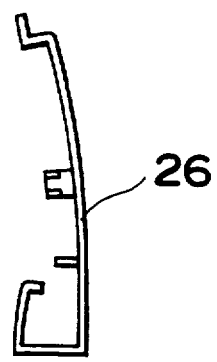
Figure 10:
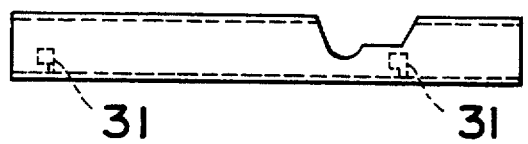
Figure 11:
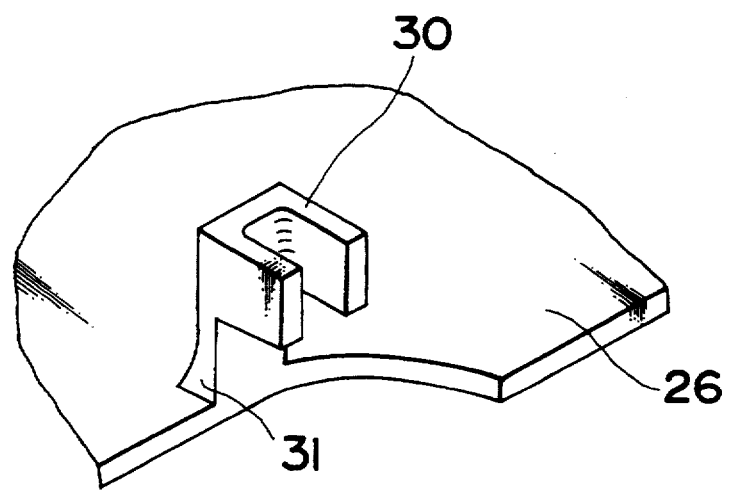
FIG. 11 is a perspective view showing a bent portion and a projection formed on the shutter of the tape cassette.
Figure 12:
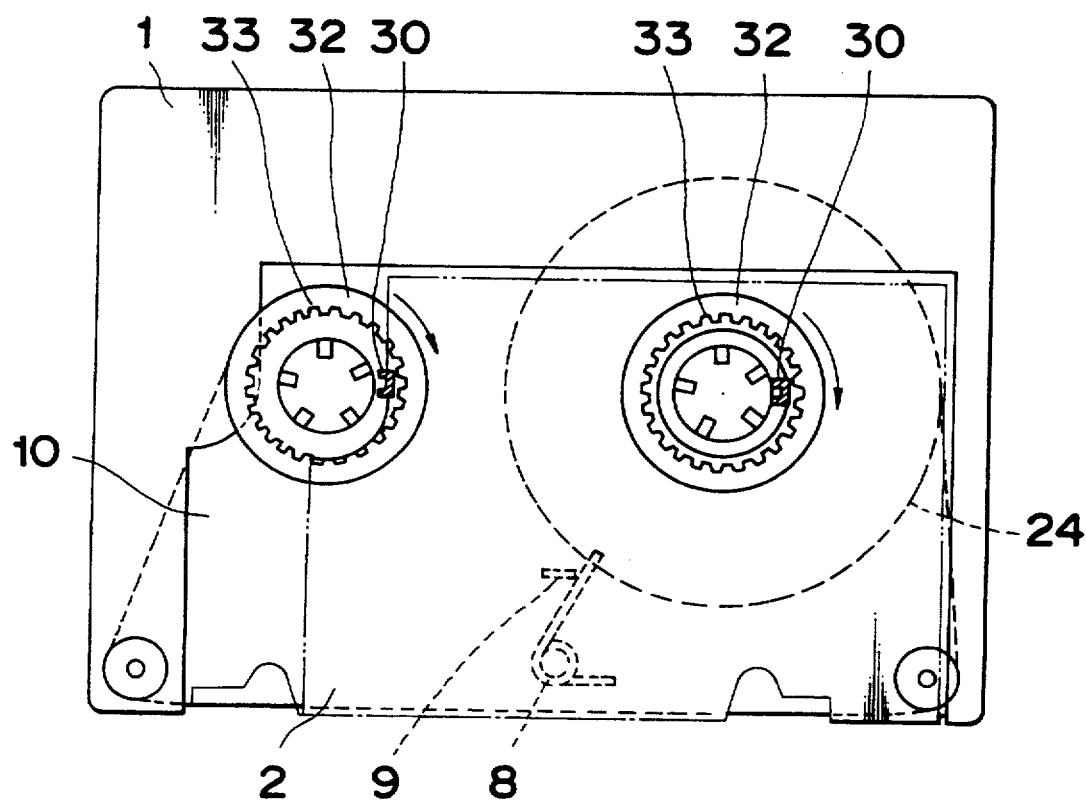
FIG. 12 is a plan view showing the tape cassette with the shutter is opened.
Figure 13:
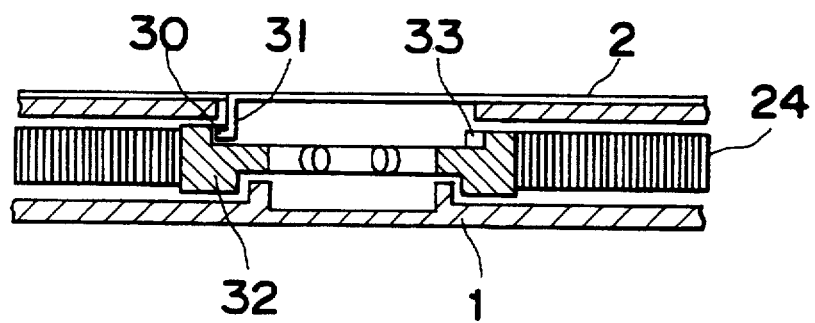
FIG. 13 is a sectional view showing the tape cassette.
Figure 14:
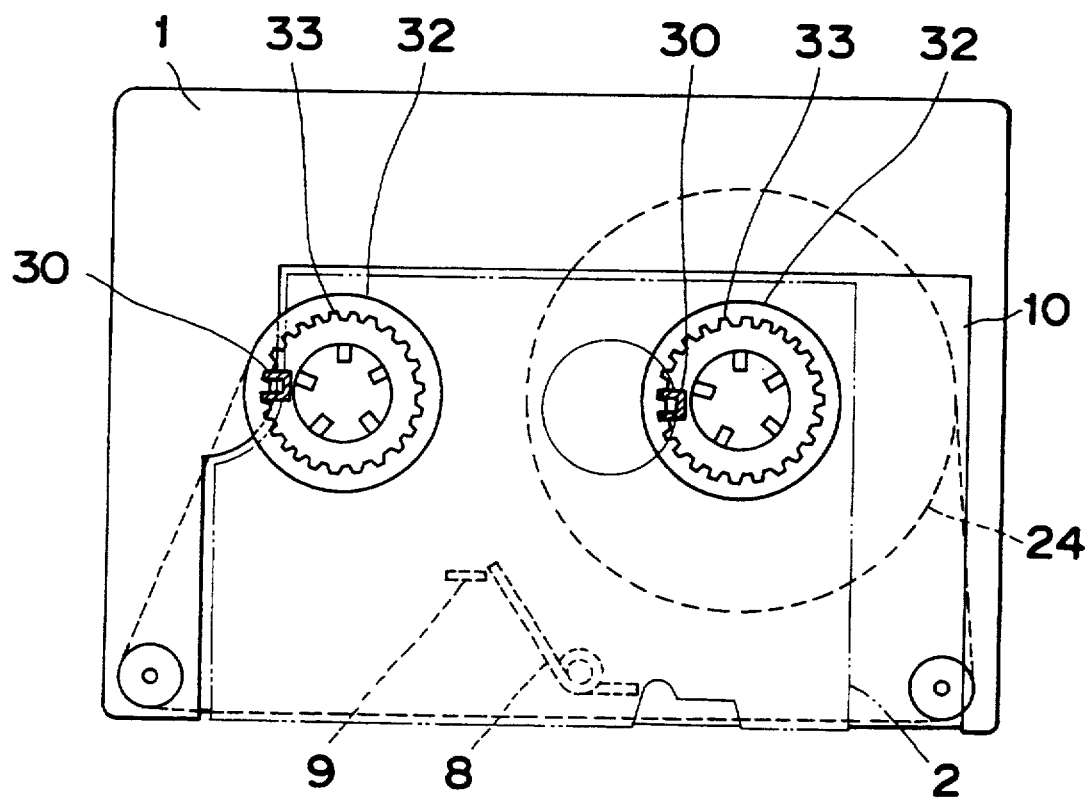
FIG. 14 is a plan view showing the tape cassette with the shutter is closed.

The casing 1 may have the following construction so as to be able to manufacture the tape cassette at a low cost. As shown in FIGS. 8 and 9, a through-opening 23 having the same dimension as that of the shutter-pressing plate 16 is formed on the lower surface of the casing 1 in such a manner that the position of the through-opening 23 coincides with the position in which the shutter-pressing plate 16 is projected. Owing to the formation of the through-opening 23, the shutter-pressing plate 16 is not undercut in shaping the casing 1 by a die. Accordingly, a die for shaping the casing 1 has a very simple construction and thus the cost of the die and the maintenance cost thereof can be reduced greatly. As a result, the casing 1 can be manufactured at a low cost. That is, the tape cassette can be manufactured at a low cost.

The above description has been made supposing that the shutter 2 is made of thermoplastic resin. But even though the shutter 2 is made of metal, for example, stainless steel, the construction of the tape cassette according to the second embodiment prevents the shutter 2 from being dislocated from the casing 1 to a great extent. Thus, the material of the shutter 2 is not limited to thermoplastic resin.

Even though the shutter 2 is not provided with the second engaging portion 14, the shutter 2 can be prevented from being dislocated from the casing 1.

In an embodiment which will be described below, a bent portion or member 31 and projections 30 for locking a pair of hubs 32 disposed inside the housing 1 are formed on the shutter 2.

Referring to FIGS. 10 through 14, in order to lock the pair of hubs 32, which wind a tape 24, the projections 30, which engage a gear 33 formed on each hub 32, are provided at the lower end of the bent portion 31 perpendicular to the lower plate 26 of the shutter 2. In order to reinforce the bent portion 31 and the projections 30, at least one rib is provided on the side of the bent portion 31 on which the projection 30 is not formed or the bent portion 31 is made to be gradually thicker toward the lower plate 26. In addition, the projection 30 is made to be gradually thicker toward the bent portion 31.

When the shutter 2 is closed by the tensile force of the spring 8, the projection 30 of the shutter 2 engages the gear 33 formed on the hubs 32 accommodated in the casing 1, and as a result the hubs 32 are locked. When the shutter 2 is opened, the projection 30 of the shutter 2 disengages from the gear 33, and as a result the hubs 32 are unlocked, i.e., the hubs 32 are capable of rotating freely.

Figure 2D:
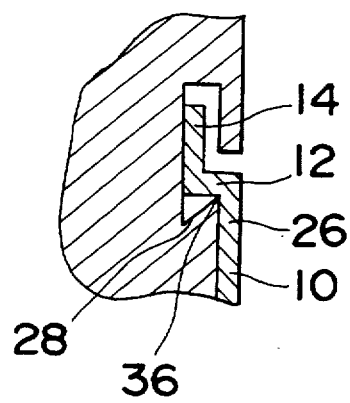
Figure 3C:
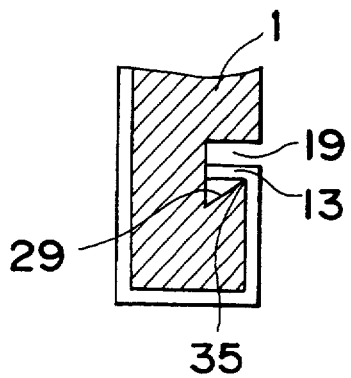

A third embodiment of the present invention is described below. Similar to the first embodiment, the first engaging portions 12 and 13 of the shutter 2 are at a right angle with the upper plate 11 and the lower plate 26 of the shutter 2, respectively. Unlike the first embodiment, as shown in FIGS. 2(d) and 3(c), the engaging surface 28 of the guide groove 15 formed on the lower side of the casing 1 makes an acute angle with the lower surface 10 of the casing 1, and the engaging surface 29 of the guide groove 19 formed on the upper side of the casing 1 also makes an acute angle with the upper surface 1 of the casing 1. The "acute angle" according to the third embodiment means an angle of more than 30° and less than 90°. This construction allows corners 35 and 36 between the upper surface of the housing 1 and the engaging surface 29 and between the lower surface 10 of the housing 1 and the engaging surface 28, respectively, to always be in engagement with each of corners 37 and 34 between the first engaging portion 12 of the shutter 2 and the lower plate 26 as well as the upper plate 11 and the engaging portion 13. Accordingly, similar to the first embodiment, the shutter 2 is not easily removed from the casing 1.

Figure 2E:
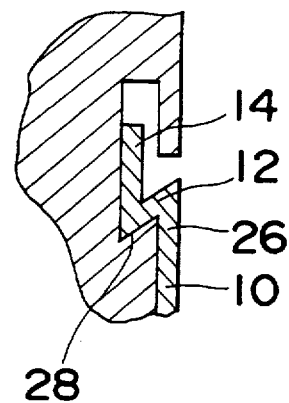
Figure 3D:
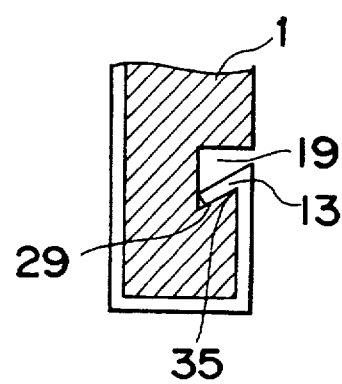

A fourth embodiment of the present invention is described below. As shown in FIGS. 2(e) and 3(d), the first engaging portions 12 and 13 of the shutter 2 make an acute angle with the upper plate 11 and the lower plate 26 of the shutter 2, respectively. The engaging surface 28 of the guide groove 15 formed on the lower side of the casing 1 makes an acute angle with the lower surface 10 of the casing 1, and the engaging surface 29 of the guide groove 19 formed on the upper side of the casing 1 also makes an acute angle with the upper surface of the casing 1. The "acute angle" according to the fourth embodiment means an angle of more than 30° and less than 80°. This construction allows the engaging portions 12 and 13 of the shutter 2 to tightly engage each of the engaging surfaces 28 and 29 formed on each the guide grooves 15 and 19 of the casing 1. The construction of the fourth embodiment is superior to those of the first through third embodiments in preventing the shutter 2 from being removed from the casing 1.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A tape cassette, comprising:
   a casing accommodating a tape recording medium, said casing having a front surface with a plurality of windows, a lower surface having a pair of reel base openings and an upper surface parallel with said lower surface;

a shutter slidably mounted on said casing for sliding in the direction from one said reel base opening to the other said reel base opening for opening and closing said windows, said shutter having a U-shape in section and comprising a lower plate contacting said lower surface of said casing, an upper plate contacting said upper surface of said casing and a front plate connecting said upper plate and said lower plate with each other and contacting said front surface of said casing, wherein said upper plate and said lower plate each has a lower end;

a pair of first engaging portions provided at said lower ends of said upper plate and said lower plate, respectively, such that one said first engaging portion is perpendicular to said upper plate, the other said first engaging portion is perpendicular to said lower plate and both said first engaging portions are parallel with said front plate;

a pair of guide grooves on said upper and lower surfaces of said casing, respectively, one said guide groove having a first engaging surface perpendicular to said upper surface and the other said guide groove having an engaging surface perpendicular to said lower surface;

wherein said first engaging portions of said upper and lower plates of said shutter engage respective said engaging surfaces of said guide grooves of said upper and lower surfaces of said casing for sliding movement along said engaging surfaces;

wherein said shutter is made of thermoplastic resin and has a thickness greater than 0.3 mm and smaller than 0.4 mm;

a second engaging portion extending from a leading end of said first engaging portion of said lower plate of said shutter, said second engaging portion being parallel with said lower plate and perpendicular to said first engaging portion of said lower plate;

a shutter pressing plate projecting on said casing over the other said guide groove, said second engaging portion being sandwiched between the other said guide groove and said shutter pressing plate; and a through-opening in said lower surface of said casing having the same size and shape as said shutter pressing plate and positioned above said shutter pressing plate so as to coincide with said shutter pressing plate in a direction perpendicular to said lower surface.

2. The tape cassette of claim 1, wherein said lower surface of said casing has a cut-away portion therein opposite said shutter pressing plate at said engaging surface of the other said guide groove, said cut-away portion being larger in side than said shutter pressing plate.

3. The tape cassette of claim 1, wherein said shutter pressing plate has a free end spaced from said engaging surface of the other said guide groove a distance greater than twice the thickness of said shutter and less than ten times the thickness of said shutter.

4. A tape cassette, comprising:

a casing accommodating a tape recording medium, said casing having a front surface with a plurality of windows, a lower surface having a pair of reel base openings and an upper surface parallel with said lower surface;

a shutter slidably mounted on said casing for sliding in the direction from one said reel base opening to the other said reel base opening for opening and closing said windows, said shutter having a U-shape in section and comprising a lower plate contacting said lower surface of said casing, an upper plate contacting said upper surface of said casing and a front plate connecting said upper plate and said lower plate with each other and contacting said front surface of said casing, wherein said upper plate and said lower plate each has a lower end;

a pair of first engaging portions provided at said lower ends of said upper plate and said lower plate, respectively, such that one said first engaging portion is perpendicular to said upper plate, the other said first engaging portion is perpendicular to said lower plate and both said first engaging portions are parallel with said front plate;

a pair of guide grooves on said upper and lower surfaces of said casing, respectively, one said guide groove having a first engaging surface perpendicular to said upper surface and the other said guide groove having an engaging surface perpendicular to said lower surface;

wherein said first engaging portions of said upper and lower plates of said shutter engage respective said engaging surfaces of said guide grooves of said upper and lower surfaces of said casing for sliding movement along said engaging surfaces;

wherein said shutter is made of thermoplastic resin and has a thickness greater than 0.3 mm and smaller than 0.4 mm,;

a shutter pressing plate projecting on said casing over the other said guide groove; and a through-opening in said lower surface of said casing having the same size and shape as said shutter pressing plate and positioned above said shutter pressing plate so as to coincide with said shutter pressing plate in a direction perpendicular to said lower surface.

5. The tape cassette of claim 4, and further comprising at least one hub in said casing having a gear thereon and a member extending perpendicularly from said lower plate of said shutter, said member having a pair of projections thereon for engaging said gear on said hub and said member having a reinforcing portion thereon.

6. The tape cassette of claim 5, wherein said reinforcing portion comprises said member gradually becoming thicker toward said lower plate.

7. The tape cassette of claim 5, wherein each said projection gradually becomes thicker toward said member.

8. The tape cassette of claim 4, wherein said lower surface of said casing has a cut-away portion therein opposite said shutter pressing plate at said engaging surface of the other said guide groove, said cut-away portion being larger in size than said shutter pressing plate.

9. The tape cassette of claim 4, wherein said shutter pressing plate has a free end spaced from said engaging surface of the other said guide groove a distance greater than twice the thickness of said shutter and less than ten times the thickness of said shutter.

* * * * *